United States Patent [19]

Sydlow

[11] Patent Number: 4,793,622
[45] Date of Patent: Dec. 27, 1988

[54] COMPACT FOLDABLE GOLF CART

[76] Inventor: Thomas Sydlow, 20951 Littlestone Rd., Harper Woods, Mich. 48225

[21] Appl. No.: 165,004

[22] Filed: Mar. 7, 1988

[51] Int. Cl.⁴ .............................................. B62B 1/04
[52] U.S. Cl. ........................................ 280/40; 280/42; 280/645; 280/646; 280/652; 280/DIG. 6
[58] Field of Search .................... 280/DIG. 6, 38, 645, 280/646, 652, 39, 40, 42

[56] References Cited

U.S. PATENT DOCUMENTS

| | | | |
|---|---|---|---|
| 2,335,579 | 11/1943 | Chamberlin et al. | 280/47.26 |
| 2,399,518 | 4/1946 | Strain | 280/DIG. 6 |
| 2,414,017 | 1/1947 | Carr et al. | 280/DIG. 6 |
| 2,415,392 | 2/1947 | Morehouse | 280/DIG. 6 |
| 2,508,059 | 5/1950 | Burtt | 280/DIG. 6 |
| 2,518,803 | 8/1950 | Marvin | 280/DIG. 6 |
| 2,563,033 | 8/1951 | Greig | 280/40 |
| 2,572,408 | 10/1951 | Vanden Hoek | 280/DIG. 6 |
| 2,899,212 | 8/1959 | Mayer | 280/38 |
| 3,079,166 | 2/1963 | Abgarian | 280/40 |
| 3,918,735 | 11/1975 | Denzer et al. | 280/DIG. 6 |
| 3,985,373 | 10/1976 | Widegren | 280/DIG. 6 |
| 4,302,029 | 11/1981 | Albertson | 280/DIG. 6 |
| 4,620,682 | 11/1986 | Yim | 280/DIG. 6 |

Primary Examiner—David M. Mitchell
Assistant Examiner—Eric D. Culbreth
Attorney, Agent, or Firm—Krass & Young

[57] ABSTRACT

A highly compact foldable golf cart comprising a tubular main support member, oppositely extending and foldable handle and bag bottom support struts, a pair of solid half axles pivotally connected to the main support tube near the bottom, a slide block telescopically mounted on the tubular main support member and a pair of axle support struts pivotally connected between the slide block and midpoints of the half axles. When the slide block is raised to fold the cart, the outboard portions of the half axles are nestingly received within slots in box-like sections of the axle support struts. The wheels are removable.

9 Claims, 2 Drawing Sheets

COMPACT FOLDABLE GOLF CART

INTRODUCTION

This invention relates to foldable golf carts and the like and particularly to a foldable golf cart which is strong and stable in the erected condition but which is light and extremely compact in the folded condition.

BACKGROUND OF THE INVENTION

A great deal of design effort has been devoted over the years to the subject of hand-pulled golf carts, most of such effort being directed toward the development of various folding mechanism and and concepts to permit the cart to be stowed in a minimum of space after use.

Many of the resulting designs represent a compromise between strength and stability in the erected condition and lightness and compactness in the folded condition; i.e., those carts which provide a substantial wheel base for stability when erected are not only fairly large when folded, but also require a large number of components which add weight and structural complexity. One such device utilizes non-removable wheels which are connected to left and right parallelogram strut assemblies which are automatically extended when a pivotal handle is rotated from a folded position to the extended position. In this device, extension of the wheel struts and wheels also raises the wheels relative to the bottom of the main support member thereby to create the three-point support arrangement which is necessary to create stability when the cart and bag stand on the ground. See Abgarian U.S. Pat. No. 3,079,166.

Other prior art golf carts are shown in Carr et al U.S. Pat. No. 2,414,017, Marvin U.S. Pat. No. 2,518,803, Burtt U.S. Pat. No. 2,508,059, Strain U.S. Pat. No. 2,399,518, Chamberlin et al U.S. Pat. No. 2,335,579, Widegren U.S. Pat. No. 3,985,373, Vanden Hoek U.S. Pat. No. 2,572,408, Morehouse U.S. Pat. No. 2,415,392, and Albertson U.S. Pat. No. 4,302,029. Carr and Marvin, as examples, use tripod arrangements with wheel base struts and diagonal braces which slide on a main support member. Neither Carr nor Marvin discloses actual half-axle wheel supports, both appear to contemplate fixed wheels and both show the plane of the wheels spaced from the bottom of the main support member and the use of the main support member as part of the tripod support system.

The present invention provides a highly compact, lightweight and mechanically simple foldable cart for golf bags and the like which provides adequate wheel base for stability when erected, yet which is lightweight and extremely compact when folded.

In general, I achieved the objectives of my invention through a structure which includes a main support member, which may be tubular in configuration, fold-out bag bottom support and handle members which are pivotally connected to the main support member at the opposite ends thereof in mirror image fashion, a pair of half-axles which are pivotally connected to the main support member at or near the bottom, a sliding anchor member which is mounted on the main support member and which is slidable between two spaced anchor points, and a pair of axle support struts which are pivotally connected between the anchor member and midpoints along the half-axles to fold and extend the half-axles as the anchor member is moved between the fixed position points. The strut members are preferably hollow and box-like in section and are slotted along at least a substantial portion thereof to receive therein the outboard portions of the half-axles when folded; i.e., the portions of the half-axles which lie outboard of the pivotal connection between the half axles and the struts nest into the support struts such that the overall length of the half-axles and the support struts, when folded, is somewhat less than the length of the main support member. In this fashion I achieve an extremely lightweight and compact, yet strong and stable, foldable cart which is particularly useful on the golf course. My invention may, of course, be used for purposes other than the transportation of golf bags but is useful for this specific and popular purpose.

In the preferred embodiment of my invention, hereinafter described in detail, I utilize removable snap-on wheels thereby to eliminate the need for complex parallelogram mechanisms to maintain the wheels in a specific attitude relative to the main support tube as they are folded. The acts of removing and installing the wheels add minimal complexity and inconvenience to the utilization of my device add substantially to the compactness thereof as will be hereinafter explained.

I also prefer in the specific and illustrative embodiment hereinafter described, to utilize a bag support mechanism which is configured to provide, along with the wheels, a stable three-point support arrangement and which is slotted so as to permit the bottom bag support member to fold into close adjacent, if not contacting, relationship with the main support member.

DETAILED DESCRIPTION OF THE ILLUSTRATIVE EMBODIMENT

Figure 1:
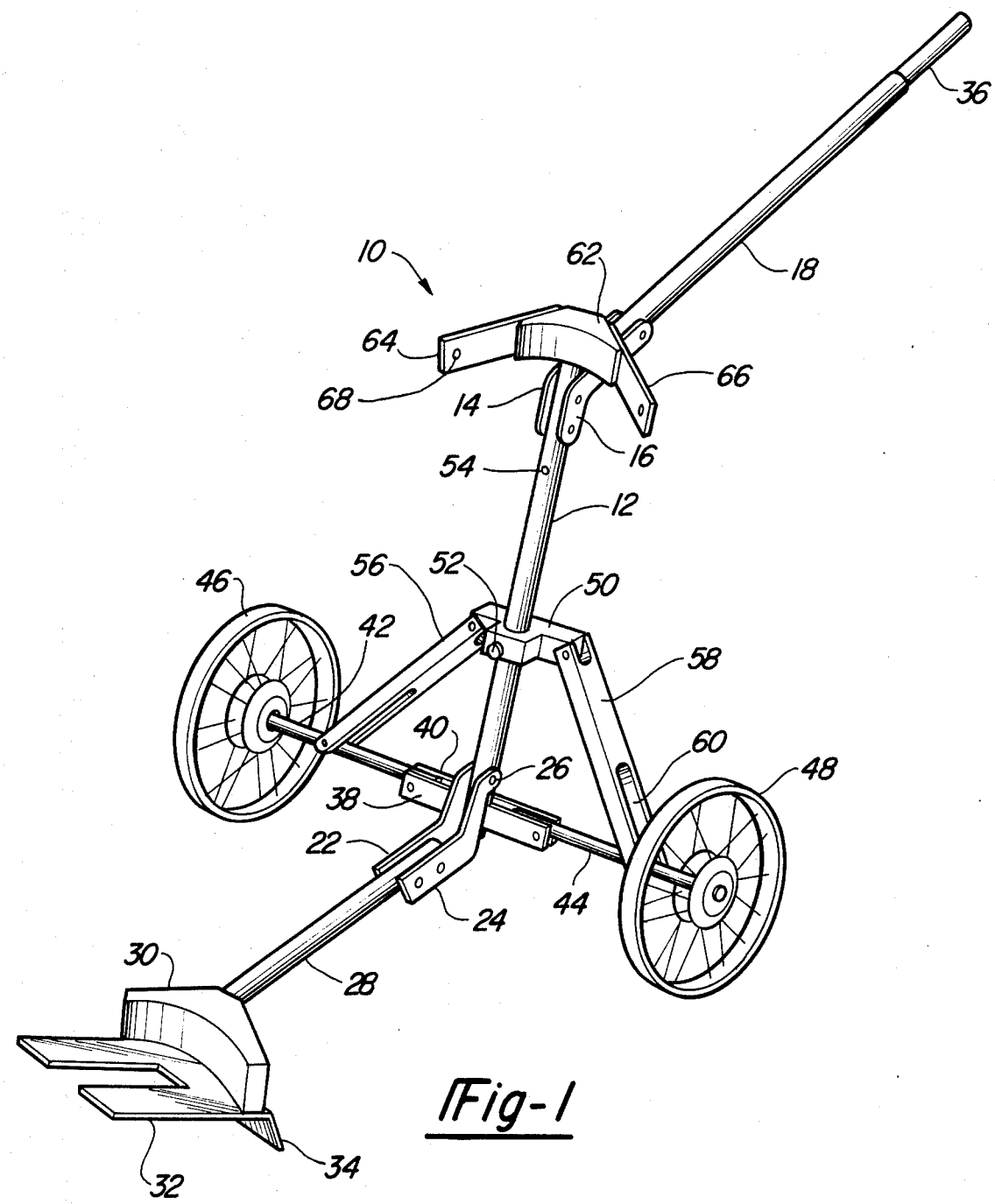
FIG. 1 is a perspective view of a golf cart embodying the invention in the erected condition.
Figure 2:
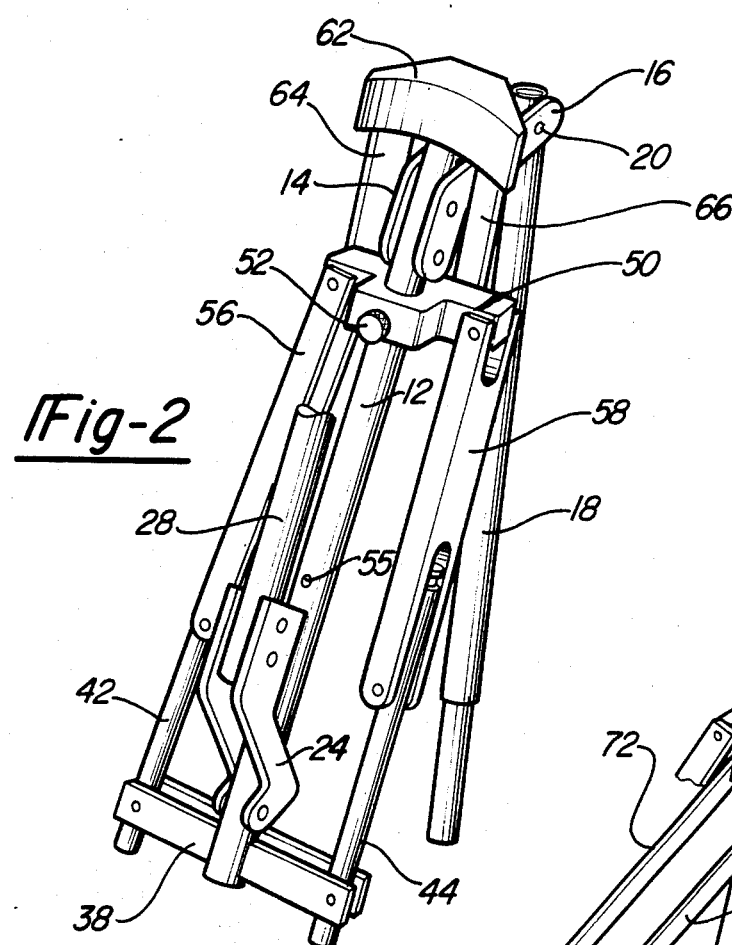
FIG. 2 is a partial view of the cart of FIG. 1 in the folded condition.

Referring first to FIG. 1, I show a manually powered golf bag cart 10 comprising the structural combination of a main support member 12 of approximately 24–28 inches in length. L-shaped brackets 14 and 16 are attached by means of suitable fasteners to the main support member 12 at or near the top end to receive and support a tubular handle member 18. As shown in FIG. 2, screws 20 or other suitable fasteners may be provided to permit the handle 18 to be folded so as to lie parallel to and essentially against the main support member 12 in the folded condition but to be erected to extend at a substantial angle away from the main support member for utilization of the cart 10.

Brackets 22 and 24 are pivotally mounted at 26 to the main support member 12 near the bottom thereof to receive a tubular bag bottom support member 28. Member 28 has rigidly connected to the outer end thereof an arcuate block 30 which is attached by screws or the like to a slotted plate 32 having a bent foot 34. The plate 32 is configured to receive and hold the base or bottom of a golf bag and the foot 34 provides one of three stable support points for holding the cart 10 and its contents upright when standing on the ground. Wheels 46 and 48 provide the other two support points. The plate 32 is slotted to accommodate the upper portion of the main support member 12 when the bag bottom support tube 28 is in the folded condition; i.e., is rotated upwardly and to the right as shown in FIG. 1 to lie essentially against the main support tube 12.

The term "lie against" is used herein to suggest a close parallel relationship which may or may not involved actual physical contact.

Main support member 12 is preferably tubular steel but may also be constructed of other metals and even plastic, with or without reinforcing fillers. The same is true of the handle 18 and the bag bottom support strut 28; i.e., all may be made of suitable, rigid and durable materials which are readily available on the market. If made of metal, the various components of the golf cart 10 herein described, are preferably coated for corrosion resistance and aesthetic appeal.

The handle 18 and bag bottom support strut 28 are pivotal in essentially mirror image fashion; i.e., the handle extends out from the top of the main support member 12 in one direction whereas the bag bottom support strut 28 extends outwardly from the main support member 12 in essentially the opposite direction, the overall configuration in the operable condition representing essentially the letter Z. When folded, the handle 18 and bag bottom support strut 28 lie against opposite fore and aft faces of the main support member 12.

Figure 3:
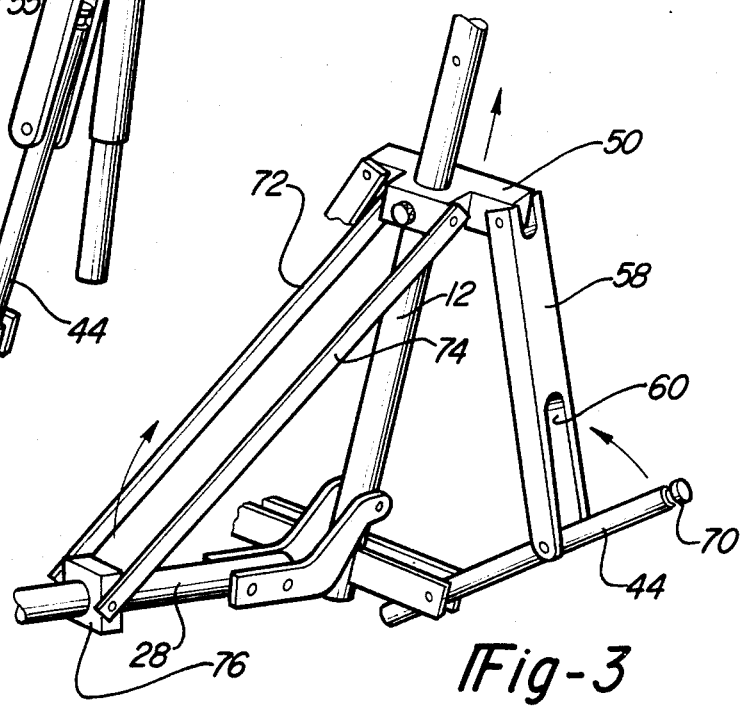
FIG. 3 is a partial view of the apparatus of FIG. 2 in a partly erected condition also showing an alternative feature.

Metal plates 38 and 40 are permanently attached to the main support member 12 at the bottom so as to extend in opposite directions and at right angles to the longitudinal axis of the main support member 12. As such, the plates 38 and 40 form a bracket to pivotally receive opposite and identical half axles 42 and 44 which removably receive snap-on large diameter wheels 46 and 48, respectively. As best shown in FIG. 3, the half axles 42 and 44 are provided by a suitable machining process with grooves 70 to receive the snap mechanisms of wheels 46 and 48. As those mechanisms are entirely conventional and are well-known in various arts, they will not be described herein.

As the inboard portions of the half axles 42 and 44 are pivotally connected to the bracket plates 38 and 40 so that they may be pivotally rotated relative to the longitudinal axis of the main support member 12, it is essential to provide adequate support for the half axles in the erected condition of the cart 10. To this end a sliding anchor block 50 is slidably disposed on the main support member 12 and may be fixed in each of two axially spaced anchor points by means of a spring detent mechanism 52; the upper detent mechanism 54 representing the folded condition of the cart 10 is shown in FIG. 1, the block 50 obscuring the lowermost hole representing the erected condition in FIG. 1. Axle support struts 56 and 58 are pivotally connected at one end to the anchor block 50 and at the opposite ends to midpoints of the half axles 42 and 44, respectively. In this case, the term "midpoints" does not necessarily infer the geometric center; rather, it refers to a point which is substantially inboard of the ends of the half axles 42 and 44 such that portions of the half axles extend outboard from the lowermost support strut pivot points when the cart is in the erected condition shown in FIG. 1.

The axle support struts 56 and 58 are preferably hollow tubular metallic members and may have a box-like structure but are provided with slots 60 along a substantial portion thereof to nestingly receive therein the aforesaid outboard portions of the half axles 42 and 44 when and as the cart assumes the folded condition shown in FIG. 2. As the outboard portions of the half axles 42 and 44 are nestingly received within the slots 60 of the support struts 56 and 58, the overall length of the combinations of half axles and support struts is less than the length of the main support member 12 as best shown in FIG. 2. This feature contributes substantially to the compactness of the cart 10 and the stability of a wide wheel base. Again, the various components described immediately above are preferably fabricated from readily available steel, plastic, or aluminum stock and are provided with appropriate pivots and fasteners and appropriate coatings for corrosion resistance and aesthetic appeal.

Figure 4:
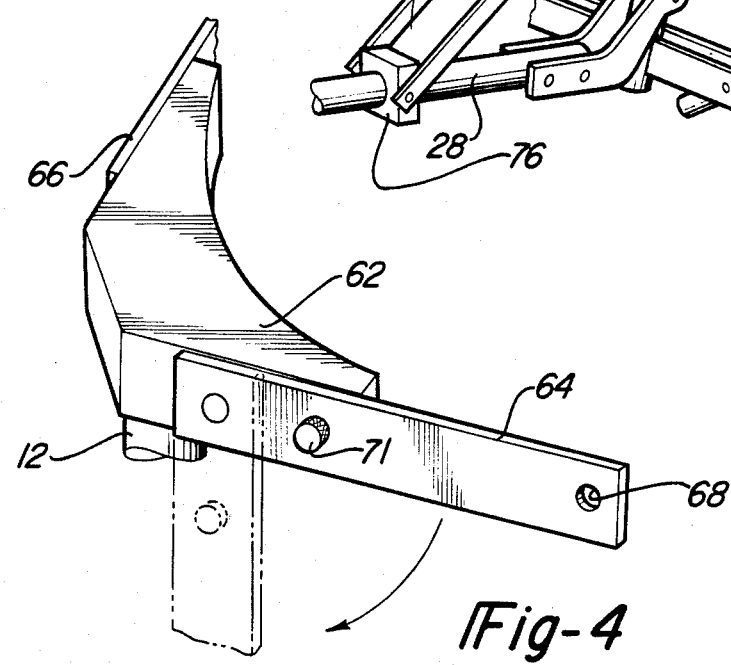
FIG. 4 is a perspective view of a lateral bag support detail in the golf cart of FIG. 1.

Additional stability in the support of a golf bag may be provided by means of a lateral support block 62 which is permanently attached to the top of the main support member 12 above the connection points of the handle brackets 14 and 16. Lateral bag support ears are provided by means of metal ear plates 64 and 66 which may be provided with holes 68 near the outboard ends to receive a shock cord or the like to help hold the typical golf bag on the cart 10. Easily removable threaded fasteners 71 are provided to disengage or remove the ear plates 64 and 66 from the block 62; preferably only one of the screws 71 is removed whereby the ear plates may be folded to the position shown in broken lines in FIG. 4.

Operation of the cart 10 is believed to be apparent from the foregoing. However, to complete the description, the reader is to assume that the cart 10 is in the erected condition shown in FIG. 1, the golf bag or other load is removed, and the user desires to fold the cart for stowage. This is achieved by first removing wheels 46 and 48. Thereafter, the anchor block 50 is disengaged by pulling on the spring detent button 52 and sliding the anchor block 50 toward and ultimately into position over the upper hole 54 in the main support member 12. This motion pivots the half axles 42 and 44 relative to the bracket plates 38 and 40 whereby outboard ends of the half axles nest into the slots 60 in the axle support struts 56 and 58 as best shown in FIGS. 2 and 3. At this time the bag bottom support tube 28 may be raised into the folded condition in which it lies essentially against the front of the main support member 12, the slot in the footplate 32 accommodating the body of the main support tube 12 as it falls into position. The ear plates 64 and 66 are then either removed or lowered and the handle 18 is finally folded into its position against the back surface of the main support member 12. The cart 10 is now ready for stowage.

Erection of the cart is just as simple; all of the foregoing steps are performed in the reverse fashion and in the reverse order; i.e., the handle 18 is raised and the ear plates 64 and 66 are either raised or reattached. The anchor block 50 is moved from the upper hole 54 to the lower hole 55 and the snap detent 52 holds it in place. This folds the half axles 42 and 44 out to provide the very substantial wheelbase which contributes to the stable character of the cart 10 when in the three-point support stance associated with normal use. The bag bottom support arm 28 is folded out and the wheels 46 and 48 are quickly attached. Note that the golf bag itself provides a connection between the footplate 32 and the lateral support block 62 at the top of the main support member 12, thus eliminating the need for a fixed connection between the brackets 22 and 24 and the bottom of the main support member 12 when the bag bottom support arm 28 is folded out.

FIG. 3 illustrates an alternative embodiment or, more accurately, an optional feature for the illustrated embodiment of FIGS. 1 and 2. The option includes a pair of rigid metal or plastic straps 72 and 74 connected between a block 76 fixed on the tube 28 and the slidable anchor black 50 so raising the tube 28 automatically slides block 50 up member 12.

The embodiment of the invention described herein is essentially illustrative in character and it will be apparent to those skilled in the art that various modifications and changes to the embodiment may be made without departing from the spirit and scope of the invention.

I claim:

1. A compact foldable cart for golf bags and the like comprising:

an elongate rigid main support member;

a load support member connected to the main support member adjacent the bottom end to lie against one side of the main support member when folded but to extend at a substantial angle therefrom when in an operative position;

a handle member pivotally connected to the main support member adjacent the top end to lie against the side of the main support member opposite one side when folded but to extend at a substantial angle therefrom when in the operative position;

a pair of half axles pivotally connected at the inboard ends thereof to said main support member adjacent the bottom end of said main support member to form a full axle when extended substantially at right angle to the main support member but pivotal to lie against the main support member when folded; said half axles being adapted to removably receive wheels at the outboard ends thereof;

an anchor member slidably mounted on the main support member between the ends thereof and manually slidable between two stable anchor points which are spaced along the main support member; and a pair of axle support struts pivotally connected between the anchor members and midpoints of respective half axles whereby sliding the anchor member between said anchor points folds and extends to half axles relative to the main support member; said struts being slotted to nestingly receive the portions of the half axles which extend outwardly from the strut pivots when folded whereby the overall length of the half axles and support struts, when folded, is less than the length of the main support member.

2. Apparatus as defined in claim 1 further including a lateral bag support member secured in an essentially fixed position to the top of the main support member.

3. Apparatus as defined in claim 2 further including fold-out lateral support ears pivotally connected to the lateral bag support member.

4. Apparatus as defined in claim 1 further including a pair of snap-on wheels adapted to be removably connected to the outboard ends of said half axles.

5. Apparatus as defined in claim 1 wherein the struts are essentially tubular in cross section.

6. Apparatus as defined in claim 1 wherein said half axles are pivotally secured to the bottom end of said main support member by means of bracket plates.

7. Apparatus as defined in claim 1 wherein said load bottom support member includes a footplate which is slotted to accommodate within said slot the main support member when in the folded condition.

8. Apparatus as defined in claim 1 wherein said anchor member is a solid block telescopically mounted on said main support member, movable between said fixed points, and securable in each of said fixed points by means of a spring detent.

9. Apparatus as defined in claim 1 further including means connecting the load support member to the anchor block to coordinate sliding of the anchor block to pivoting of the load support member.

* * * * *